United States Patent [19]

Stevens

[11] Patent Number: 4,825,345
[45] Date of Patent: Apr. 25, 1989

[54] PORTABLE AUTOMOBILE LIGHT
[76] Inventor: William M. Stevens, 9717 Oak Hollow Dr., Austin, Tex. 78758
[21] Appl. No.: 135,683
[22] Filed: Dec. 21, 1987
[51] Int. Cl.⁴ ............................................. F21L 11/00
[52] U.S. Cl. ..................................... 362/183; 362/61; 362/157
[58] Field of Search ......................... 362/183, 61, 157

[56] References Cited

U.S. PATENT DOCUMENTS

| | | | |
|---|---|---|---|
| 2,628,339 | 2/1953 | Werner | 362/183 |
| 3,096,941 | 7/1963 | Miller | 362/183 |
| 3,749,905 | 7/1973 | Friedman | 362/183 |
| 4,092,580 | 5/1978 | Prinsze | 362/183 |

FOREIGN PATENT DOCUMENTS

| | | | |
|---|---|---|---|
| 229736 | 11/1943 | Switzerland | 362/183 |
| 2077525 | 12/1981 | United Kingdom | 362/183 |

Primary Examiner—Douglas Hart
Attorney, Agent, or Firm—Joseph F. Long

[57] ABSTRACT

This invention encompasses simplified equipment to provide a fully charged direct current portable light that may be readily mounted in the passenger compartment of a car.

7 Claims, 1 Drawing Sheet

PORTABLE AUTOMOBILE LIGHT

BACKGROUND OF THE INVENTION

Many people carry a flashlight in their cars for intermittent or emergency use. There is a problem in that such flashlight batteries do at times become discharged and the flashlight may be inoperative when most needed. This invention covers a simple way to keep a direct current light hooked to a charging unit so that a small reliable fully charged portable light may be kept in the vehicle. The novelty of the unit lies in the combination of a simple flashlight modification so that a battery operated light may be hooked to a charging unit contained in a housing (that also will hold the light) and in securing an electrical source by a special adapter to connect into a fuse box. Further, the circuit leading from the light to the special adapter is fused so as to prevent damage from an electrical short in the system. In preferred embodiment of the invention the automobile fuse box is used as a current source. In this instance a fuse is removed, the fuse is then fitted into a fuse holder with 3-4" lead wires to a male spade type connector that plugs back into the space from which the fuse was removed; now another wire fastens to one side of the spade type connector, and then leads to the charging unit. This wire will normally contain an in-line fuse. The circuit to the charger is completed by a second wire that leads from the charger to a grounding point such as a screw head on a metallic part of the automobile The invention then fills a need in a simple way, to have a reliable functional portable light readily available in a car. Special mounting mechanisms on the housing containing the charging unit allows mounting the housing which is the light and charger holder in a readily accessible place in the automobile passenger compartment. In one preferred mounting, metallic tines allow mounting the unit to the carpet by sliding the tines through the carpet. This then allows easy mounting in an unused part of the floor space in the passenger compartment. We have considered the following U.S. Pat. Nos.

1. 4,372,638 02/18/83 to Lawrence J. Sohler
2. 3,320,385 05/16/67 to H. A. Sherwood These patents are in the same field as the present invention but the present invention encompasses non-obvious and unique differences.

BRIEF DESCRIPTION OF THE INVENTION

This invention encompasses equipment to maintain a direct current portable light in an automobile in a fully charged mode. Briefly, the invention comprises:

(a) a special adapter so that a fuse in the automobile fuse box may be removed; the fuse plugged into a special fuse holder that is equipped with 3-4" lead wires terminating in spade type connector that will plug back into the fuse box, and a third wire leading to one side of the spade type connector, and thence to a charging unit. This special fuse holder then plugs back to put the original fuse back in its circuit;

(b) a circuit to the charger is provided by the one wire leading to the fuse box and a second wire leading to a ground;

(c) a portable light which may be a flashlight with the rearward cap modified to have male type connectors to plug into the charging unit and internal wiring to connect to the batteries to allow maintaining the batteries fully charged;

(d) an indicator light in the circuit leading to the charger to indicate that the circuit is activated. This is useful when connecting the ground wire to ascertain that the ground wire is properly connected;

(e) an in-line fuse in one line leading to the charger;

(f) a housing to removably hold the light and to hold the charger; this housing being equipped with special tines to anchor it to the carpet in the automobile or special clamps to allow mounting in the automobile passenger compartment.

Briefly, then the invention covers a special adapter to allow getting current to a charger from the fuse box and at the same time keep all the fuses in their circuits. One fuse is unplugged from the box and put into a special fuse holder equipped in the two 3-4" lead wires that connect to each side of a spade type connector and with a third wire leading from this spade type connector to provide current to a charger. The charger circuit is completed by a ground wire from the charger to a grounding point. An in-line fuse in the wire leading from the fuse box to the charger is also used. An indicator light located in the housing holding the charger and electrically in the charging circuit indicates when the charger is activated and may be used to ascertain that the ground wire is hooked to a proper grounding point to complete the charger circuit. Obviously, changes could be made in mechanical details and we do not wish to be limited to exact details but only as to spirit and purpose as outlined in these claims and specifications.

DETAILED DESCRIPTION OF THE DRAWING

Figure 1:
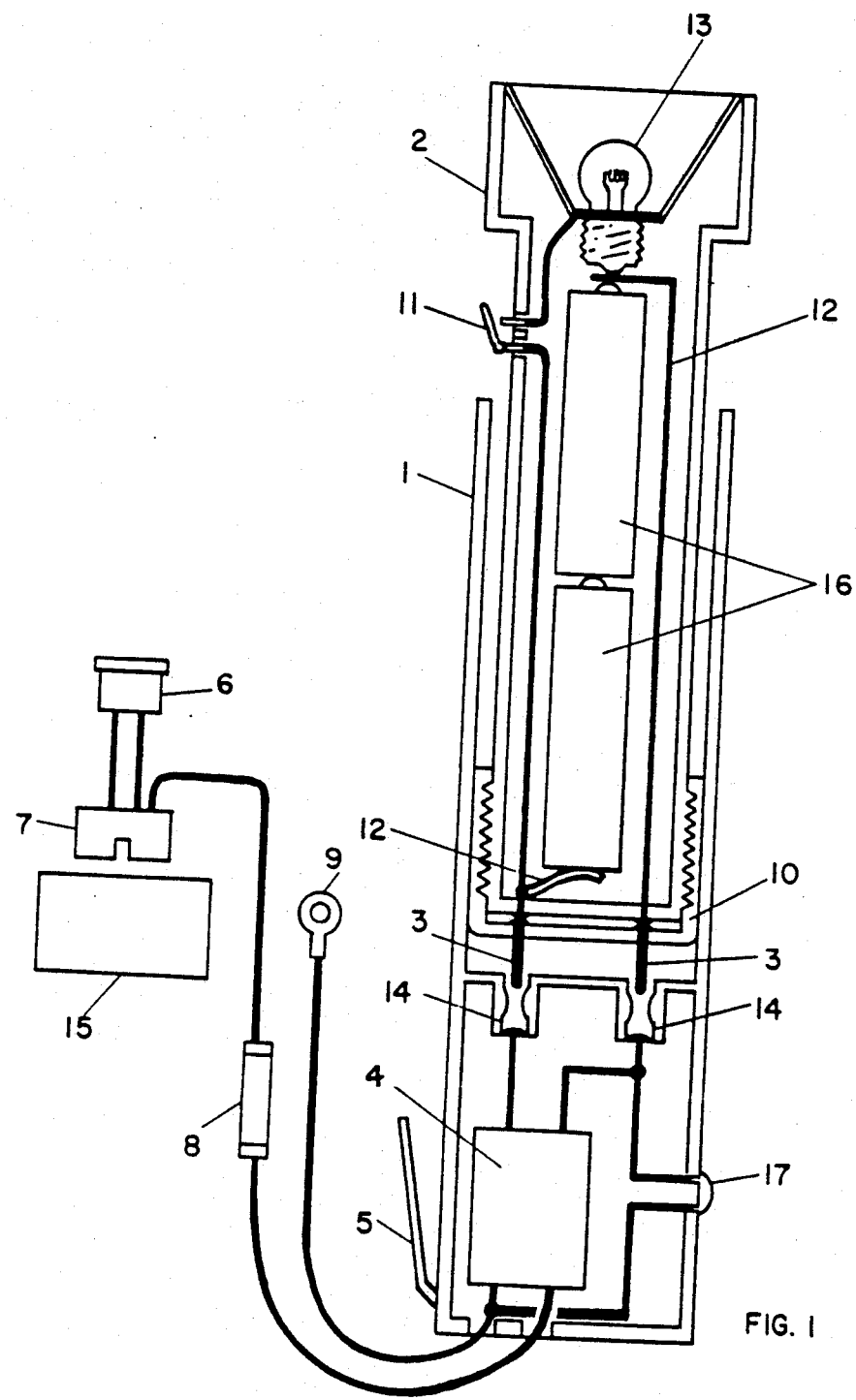
FIG. 1 shows the entire unit with a spade type connector plugging into the space where a fuse was removed with connections to put the removed fuse back into its circuit with lead wires that also include a hot wire to the charging unit; the output of the charging unit maintains the batteries in the portable removable light at full charge; an indicator light in the charger circuit indicates when the unit is electrically activated.

In FIG. 1, we show a cylindrical housing 1, a battery operated light 2 with male plugs 3 to plug the light 2 into the outlet 14 of the charger 4. This embodiment shows tines 5 that can be used to anchor the housing to the carpet The spade type connector 3 plugs into fuse box 15; and the removed fuse fits back into fuse holder 6. An in-line fuse 8 is shown in the hotline leading from a lead wire between fuse holder 6 and spade type connector 7; the hotwire containing fuse 8 then lead to the charger unit 4. The circuit to the charger unit 4 is completed by hooking connector 9 to a ground, which may be conveniently secured under a screw head in a metallic portion of the vehicle. The light 17 serves to indicate activation of the charger unit 4. This activation occurs when the ground connector 9 is hooked to a proper grounding point. The male plugs 3 plug into the output from the charger 4 with the circuit to activate light bulb 13 going from one plug 3 to the base of batteries 16 and through a hand operated switch 11, thence through bulb 13 and when switch 11 is closed back to the other plug 3. Charging circuit 12 goes from one plug 3 through batteries 16 and back to the other plug 3. Thus batteries 16 will hold at maximum charge.

What is claimed is:

1. An always charged portable automobile light comprising:
   (a) a housing to removably hold a battery operated light and a charging means,
   (b) a battery means in said battery operated light replaceable electrically connected to said charging means,
   (c) a fused means to connect said charging means into an automobile fuse box in a position where one fuse has been removed and said one fuse is electrically connected back into said position,
   (d) a means to removably anchor said housing means in an automobile.

2. An always charged portable automobile light as in claim 1, where said fused means to connect said charging means to said automobile fuse box comprises:
   (a) a fuse holder to removably receive said one fuse removed from said automobile fuse box,
   (b) lead wires connecting said fuse holder to a spade type fuse connector,
   (c) a first electrically conductive wire connected to one side of said spade type fuse connectors and leading to said charging means,
   (d) an in-line fuse in said first electrically conductive wire,
   (e) a second electrically conductive wire leading from said charging means and equipped with a connector to connect to a grounding point near said charging means.

3. An always charged portable automobile light as in claim 1, where said means to removably anchor said housing means snaps into said housing and has sharpened points that may be used to anchor said housing to a carpet in said automobile.

4. An always charged portable automobile light as in claim 1, where said means to removably anchor said housing means is a spring clip on said housing that may be used to clip said housing under a dashboard of said automobile.

5. An always charged portable automobile light as in claim 1, where said means to removably anchor said housing means is a clamp suitable for clamping said housing to said automobile steering post.

6. An always charged portable automobile light as in claim 1, where said battery operated light is a flashlight that has been modified to have two male outlet plugs to plug into said charging unit and then so electrically connected internally as to allow charging said battery means.

7. An always charged portable automobile light as in claim 1, where said charging means is equipped with an externally visible light emitting diode that indicates when said charging means is activated.

* * * * *